(12) United States Patent
Yin et al.

(10) Patent No.: US 10,723,212 B2
(45) Date of Patent: Jul. 28, 2020

(54) QUICK LOCKING-UNLOCKING ASSEMBLY

(71) Applicant: NIO CO., LTD., Shanghai (CN)

(72) Inventors: Changjiu Yin, Shanghai (CN); Jingyuan Wang, Shanghai (CN)

(73) Assignee: NIO CO., LTD., Shanghai (CN)

( * ) Notice: Subject to any disclaimer, the term of this patent is extended or adjusted under 35 U.S.C. 154(b) by 373 days.

(21) Appl. No.: 15/870,188

(22) Filed: Jan. 12, 2018

(65) Prior Publication Data
US 2018/0201110 A1 Jul. 19, 2018

(30) Foreign Application Priority Data

Jan. 13, 2017 (CN) .......................... 2017 1 0024647

(51) Int. Cl.
*B60K 1/04* (2019.01)
*F16B 35/04* (2006.01)
(Continued)

(52) U.S. Cl.
CPC .............. *B60K 1/04* (2013.01); *B60L 50/64* (2019.02); *B60L 50/66* (2019.02); *B60L 53/80* (2019.02); *F16B 21/073* (2013.01); *F16B 35/041* (2013.01); *F16B 35/045* (2013.01); *F16B 39/282* (2013.01); *H01M 2/1083* (2013.01); *B60K 2001/0455* (2013.01); *H01M 2220/20* (2013.01); *Y02T 90/124* (2013.01)

(58) Field of Classification Search
CPC ...... F16B 21/073; F16B 23/00; F16B 33/002; F16B 35/041; F16B 35/045; F16B 35/06; F16B 39/00; F16B 39/282; B60K 1/04; B60L 50/64; B60L 50/66; B60L 53/80

USPC .......................................................... 411/166
See application file for complete search history.

(56) References Cited

U.S. PATENT DOCUMENTS 3,212,746 A * 10/1965 Wright ...................... F16B 2/12
410/77
3,282,316 A * 11/1966 Griswold ............. H05K 7/1412
411/326

(Continued)

*Primary Examiner* — Roberta S Delisle
(74) *Attorney, Agent, or Firm* — Sheridan Ross P.C.

(57) ABSTRACT

The present application relates to the field of swapping batteries of electric vehicles, particularly to a quick locking-unlocking assembly. The present application aims at solving the problem in the prior art that each locking mechanism of current electric vehicle power battery has too many parts and sophisticated structure, occupying larger space and thus increasing cost in manufacturing the electric vehicles. The quick locking-unlocking assembly of the application includes: a first sliding block and a second sliding block slidably connected to the electric vehicle body, a retaining sheath fixed to the outer shell of the power battery, a first spring and a second spring for forcing the first and second sliding blocks to move closer to each other, a bolt capable of extending through the retaining sheath and the first and second sliding blocks, and a third spring forcing the bolt away from the vehicle body. Further, the bolt is provided with a cam, by rotating which the first and second sliding blocks are forced to separate away from each other. Thus, the bolt is able to leave the electric vehicle under effect of the third spring. Accordingly, the quick locking-unlocking assembly of the present application is simple in structure and convenient in operation.

13 Claims, 8 Drawing Sheets

(51) Int. Cl.
*F16B 21/07* (2006.01)
*B60L 50/60* (2019.01)
*B60L 53/80* (2019.01)
*B60L 50/64* (2019.01)
*F16B 39/282* (2006.01)
*H01M 2/10* (2006.01)

(56) References Cited

U.S. PATENT DOCUMENTS

| | | | | |
|---|---|---|---|---|
| 3,305,995 | A | * | 2/1967 | Glover ................ F17C 13/004 52/512 |
| 5,704,100 | A | * | 1/1998 | Swan ................ F16B 21/186 24/546 |
| 7,753,632 | B2 | * | 7/2010 | Naitou ................ F16B 1/0014 411/511 |
| 8,221,043 | B2 | * | 7/2012 | Guyton ................ F16B 1/0014 411/511 |

* cited by examiner

QUICK LOCKING-UNLOCKING ASSEMBLY

CROSS-REFERENCE TO RELATED APPLICATION

This application claims the benefit of China Patent Application No. 201710024647.1 filed 13 Jan. 2017, the entire disclosure of which is incorporated herein.

TECHNICAL FIELD

The present application relates to the field of swapping batteries of electric vehicles, particularly to a quick locking-unlocking assembly.

BACKGROUND

As energy and environment related pressures become increasingly high, new energy vehicle, thanks to its advantages in environmental protection and energy conservation, becomes one of the major research focuses in vehicle industry. Taking electric vehicles for example, on-board power supplies mainly include rechargeable batteries and replaceable batteries. Compared with rechargeable battery, an electric vehicle with a replaceable battery is supplied with power by swapping its battery. Therefore, this energy replenish pattern is proved to be one of the most popular technologies in the industry because of its shorter operation time, convenient automation operation and longer lifespan.

Since the battery swapping mechanism on chassis of a battery swapping electric vehicle is typically quite heavy, it is necessary to provide several locking mechanisms to lock and unlock the battery swapping mechanism. At present, a set of automatic unlocking equipments are used to unlock several locking mechanisms, each of which is for example provided with a torque spanner driven by a servo motor. However, since each locking mechanism has many parts, which is sophisticated in structure and occupies larger space, thus increasing cost in manufacturing the electric vehicle.

Accordingly, there is a need in the art for a new locking mechanism for electric vehicle power battery to solve the previously mentioned problem.

SUMMARY

To solve the above problems in the art that the locking mechanism of an electric vehicle power battery has too many parts and sophisticated structure, occupying larger space and thus increasing cost in manufacturing the electric vehicle, the present application provides a quick locking-unlocking assembly for attaching a power battery to and detaching it from an object device, which comprises: a bolt which is provided in the power battery and able to move relative to the battery in an axis direction; and a set of sliding blocks including more than one sliding blocks, wherein the more than one sliding blocks are slidably connected to the object device respectively and by means of sliding, form a guide hole allowing the bolt to move.

In a preferable embodiment of the above quick locking-unlocking assembly, the bolt has a flange-shaped structure radially extending outwards, the flange-shaped structure can synchronously rotate along with the bolt, thereby forcing the more than one sliding blocks to slide in a way that enlarges diameter of the guide hole.

In a preferable embodiment of the above quick locking-unlocking assembly, the flange-shaped structure is a cam.

In a preferable embodiment of the above quick locking-unlocking assembly, the set of sliding blocks includes a first sliding block and a second sliding block opposed to each other; in assembled state, the bolt is radially housed within the guide hole formed by the first and second sliding blocks, and the screw cap of the bolt axially abuts the first and second sliding blocks; then by rotating the bolt, the first sliding block and the second sliding block slide to move away from each other, enabling the screw cap to move within the guide hole.

In a preferable embodiment of the above quick locking-unlocking assembly, each of the sliding blocks is provided with a cavity and a restoration assembly in its sliding direction, each restoration assembly includes: a guide post which is secured to the object device and able to enter/exit its respective cavity; and a first restoration spring provided between its respective guide post and its respective cavity.

In a preferable embodiment of the above quick locking-unlocking assembly, the quick locking-unlocking assembly also comprises a stopper which includes: a sleeve surrounding the outside of the bolt; a retaining sheath provided in outer shell of the power battery; and a second restoration spring provided between the sleeve and the retaining sheath.

In a preferable embodiment of the above quick locking-unlocking assembly, one end of the retaining sheath is provided with a retaining slot; in assembled state, the flange-shaped structure of the bolt rests in the retaining slot to prevent the bolt from rotating.

In a preferable embodiment of the above quick locking-unlocking assembly, the bolt is connected with a fastening nut, through which the bolt is connected with the outer shell of the power battery.

In a preferable embodiment of the above quick locking-unlocking assembly, the outer shell of the power battery is provided with a locking cap; in assembled state, the fastening nut abuts the locking cap in an axial direction.

In a preferable embodiment of the above quick locking-unlocking assembly, the locking cap is connected with a sealing cover; in assembled state, the fastening nut is disposed within a sealing cavity formed by the locking cap and the sealing cover.

It should be understood by those skilled in the art that in the optimized technical solutions of the present application, a guide hole is formed between the first sliding block and the second sliding block by providing the opposed first and second sliding blocks on the object device (an electric vehicle body for example), which are close to each other, able to slide relative to each other and abut each other under effect of first restoration springs. Still further, the bolt, which is connected with the outer shell of the power battery by the fastening nut, is provided with a screw nut, a cam and a sleeve, a retaining sheath is provided in the outer shell of the power battery, and a second restoration spring is provided between the retaining sheath and the sleeve within which the bolt is inserted. Still further, the screw cap can pass through the guide hole and thus abut the first and second sliding blocks under effect of the second restoration spring; the first and second sliding blocks are able to be separated apart from each other by introducing the cam between them and rotating the bolt, accordingly the bolt leaves the vehicle body under effect of the second restoration spring.

Hence, the quick locking-unlocking assembly of the present application has the advantages of simple structure, convenient operation and reduced manufacturing cost.

Figure 1:
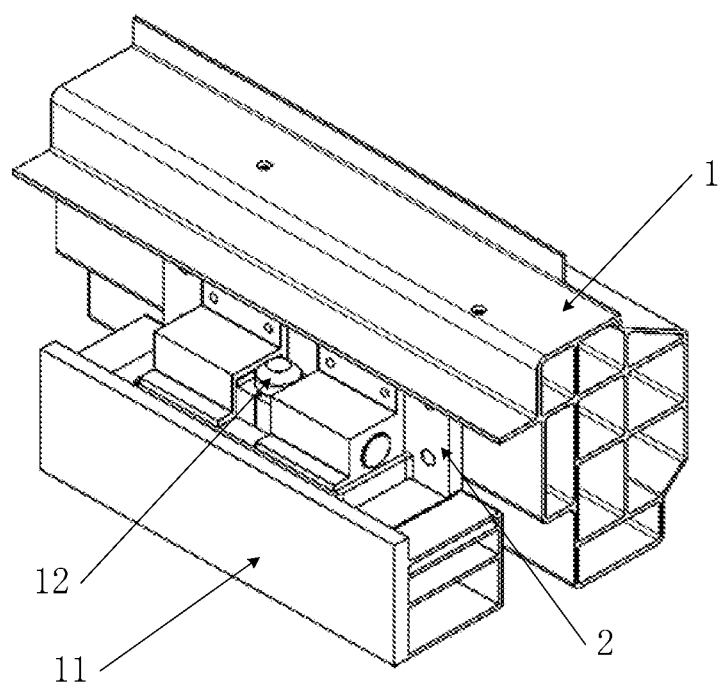
FIG. 1 is a schematic view of a quick locking-unlocking assembly of the present application.

LIST OF REFERENCE SIGNS 1. vehicle body; 2. bracket; 201. vehicle body bracket portion; 202. battery bracket portion; 3. first sliding block; 4. second sliding block; 5. first spring; 6. second spring; 7. first guide post; 8. second guide post; 9. guide hole; 10. slot; 11. outer shell; 12. bolt; 121. screw cap; 122. cam; 123. driving structure; 13. sleeve; 14. retaining sheath; 141. retaining slot; 15. third spring; 16. locking cap; 161. through hole; 162. lip structure; 163. tooth shaped groove; 17. fastening nut; 18. sealing cover; 181. clip; 182. teeth structure; 183. hex socket.

DETAILED DESCRIPTION

The preferred embodiments of the present application will be described below with reference to the accompanying figures. As will be understood by those skilled in the art that these embodiments are merely used for interpreting the technical principle of the present application and are not intended to limit its protection scope in any way. By way of example, the quick locking-unlocking assembly of the present application is described by means of the power battery mounted onto an electric vehicle chassis; particularly, the power battery is dismounted from the battery cabinet of the electric vehicle through the quick locking-unlocking assembly of the application. However, it is obvious that at least the present locking-unlocking assembly can also be used in equipment with same structure as the battery cabinet of an electric vehicle. For example, the equipment may be a battery recharging or swapping station's energy storing unit for swapping depleted batteries dismounted from electric vehicles, the energy storing unit has a connecting structure identical to that of a battery cabinet in order to realize dismantling of a power battery. In addition, the locking-unlocking assembly can be modified as desired by those skilled in the art to accommodate specific applications.

It should be noted that in the description of the present application, the usage of such directional and positional terms as central, upper, lower, left, right, vertical, horizontal, inner and outer is based on the directional and positional relations shown in the drawings, and used to facilitate the description itself and does not express or imply any indispensable specific positions or specific operational and structural positions of the devices or elements of the disclosure. Therefore, the usage is not to be understood as limitation on the present application. Additionally, terms such as first, second and third are merely provided for the purposes of description rather than expressing or implying their relative importance.

Moreover, it should also be noted that in the description of the present application, unless otherwise specified and defined, the terms of install, connect and couple should be construed in their broad meaning, which can be understood as permanent or detachable or integrally connecting, mechanically or electrically connecting, direct connecting or indirect connecting via an intermediate part, or even connecting between the inner parts of two elements. Those skilled in the art could interpret the specific meanings of the above-mentioned terms based on the context.

Figure 2:
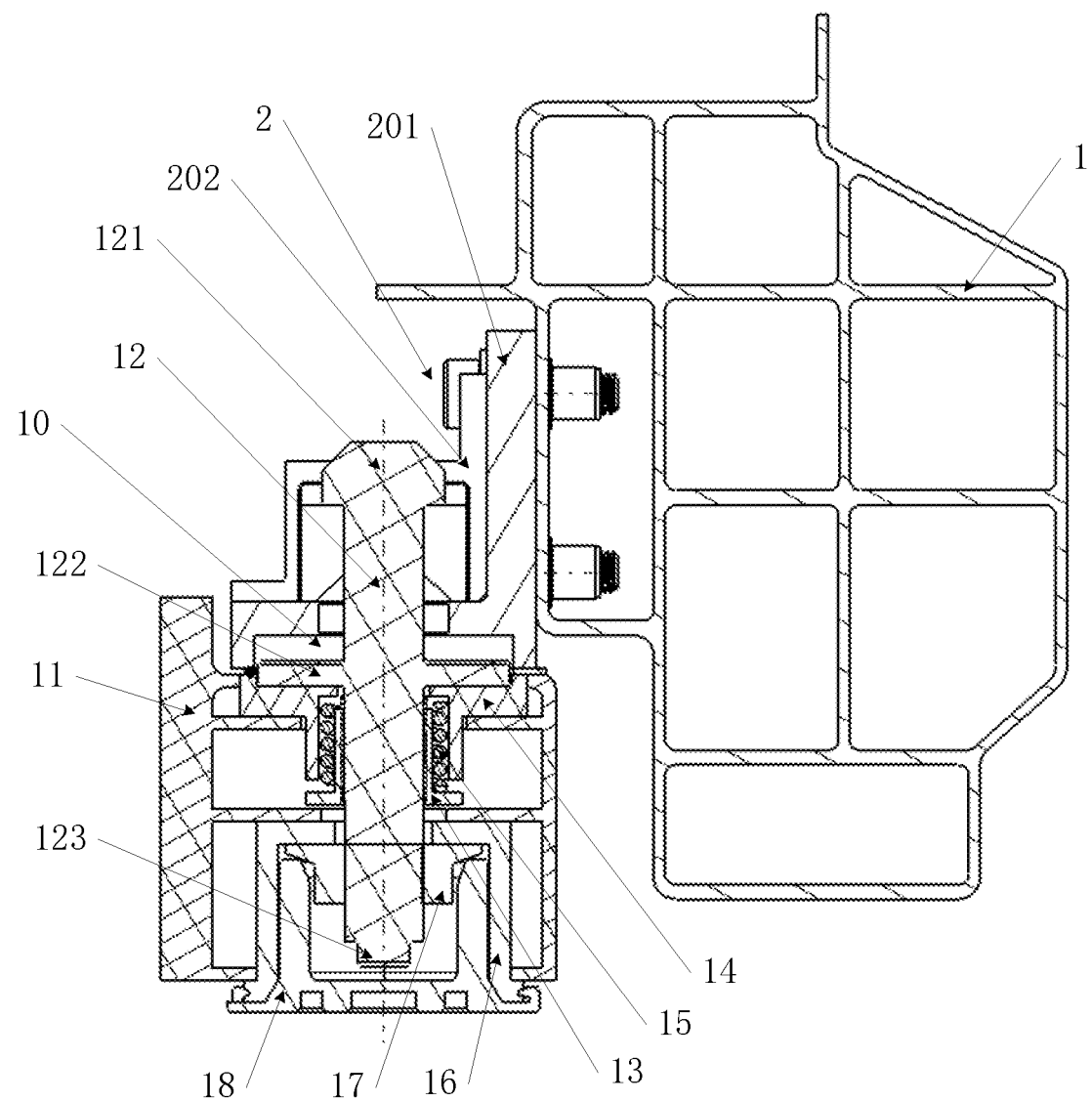
FIG. 2 is a first cross sectional view of the quick locking-unlocking assembly of the present application.
Figure 3:
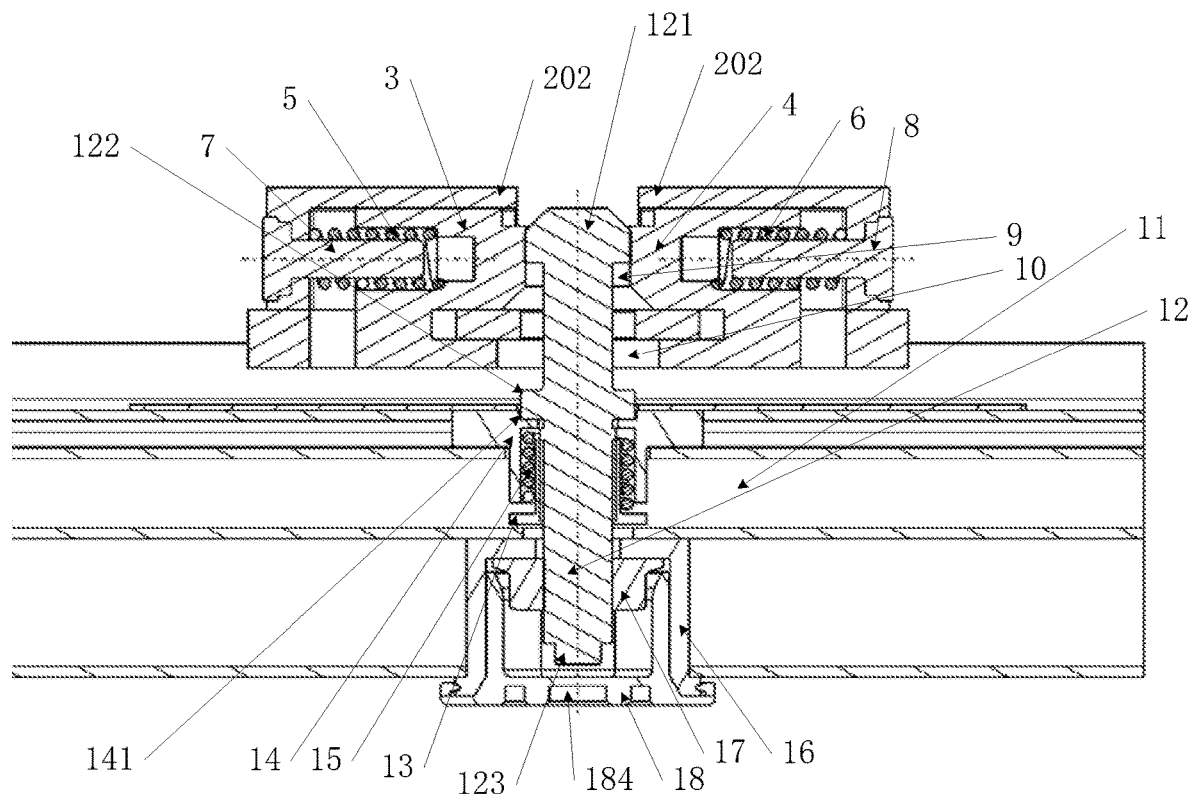
FIG. 3 is a second cross sectional view of the quick locking-unlocking assembly of the present application taken perpendicularly to the first cross sectional view in FIG. 2.

As shown in FIG. 1 to FIG. 3, the quick locking-unlocking assembly of the application is mainly used for attaching a power battery onto an electric vehicle. The assembly is comprised primarily of a set of sliding blocks slidably mounted to a vehicle body 1 and a bolt 12 provided in the outer shell 11 of the power battery. Specifically, the set of sliding blocks is slidably connected to the vehicle body 1 through a bracket 2, which includes a vehicle body bracket portion 201 fixedly connected to the vehicle body 1 via bolts and a battery bracket portion 202 fixedly connected to the bracket portion 201 via bolts. As can be understood by those skilled in the art that the quick locking-unlocking assembly of the application is not only used for attaching a power battery onto an electric vehicle body 1, but also used for assembling it onto other device. For example, the device may be an energy storing unit of a battery recharging or swapping station capable of supplying power to electric vehicles by directly swapping their batteries, the energy storing unit, which is used for storing and charging depleted batteries dismounted from electric vehicles, has a power battery connecting structure corresponding to the locking-unlocking assembly.

As shown in FIG. 3, there are a first restoration assembly and a second restoration assembly respectively connected to the left and right sides of the battery bracket portion 202. Wherein the first restoration assembly includes a first spring 5 and a first guide post 7, the second restoration assembly includes a second spring 6 and a second guide post 8. The set of sliding blocks includes a first sliding block 3 and a second sliding block 4 corresponding respectively to the first and second guide posts 7 and 8, and the first sliding block 3 is provided with a first cavity (not indicated in the figures) at its left side and the second sliding block 4 is provided with a second cavity (not indicated in the figures) at its right side. Wherein the first and second cavities are the cavities described in claims. Further, the first spring 5 is provided between the first sliding block 3 and the first guide post 7. Particularly, the first guide post 7 is inserted within the first spring 5, the right side of the first spring 5 is housed within the first cavity and the right end of the first spring 5 is pressed against the first cavity's stepped surface, the left end of the first spring 5 is pressed against the battery bracket portion 202 at its left side. The second spring 6 is provided between the second sliding block 4 and the second guide post 8. Particularly, the second guide post 8 is inserted within the second spring 6, the left side of the second spring 6 is housed within the second cavity and the left end of the second spring 6 is pressed against the second cavity's stepped surface and the right end of the second spring 6 is pressed against the battery bracket portion 202 at its the right side. Wherein the first and second springs 5 and 6 are the first restoration springs described in the claims. Still further, in FIG. 3, the first sliding block 3 and the second sliding block 4 form a guide hole 9 and a slot 10, the cross section of the slot 10 is preferably in the shape of ellipse (not indicated in the figures). It should be understood by those skilled in the art that the set of blocks is not limited to two blocks (the first block 3 and the second block 4), the number of the blocks can be suitably adjusted as desired up and down to for example 1 or 3.

Figure 4:
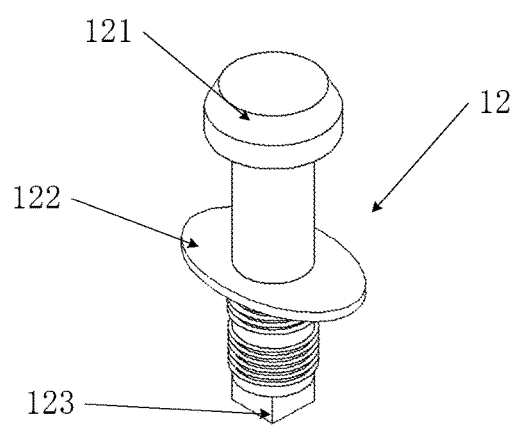
FIG. 4 is a schematic illustration of the bolt of the quick locking-unlocking assembly of the present application.

As shown in FIG. 4, the bolt 12 is provided with a screw cap 121 on its top, a cam 122 at its middle portion and a driving structure 123 at its bottom. Preferably, the screw cap 121 is provided with a guide structure (not indicated in the figures) to facilitate its introduction into the guide hole 9. In an optimized technical solution of the application, the screw cap 121 has a tapering guide structure or a guide structure in other forms conceivable as desired by those skilled in the art, as long as it is able to successfully introduce the screw cap 121 into the guide hole 9.

Further, as shown in FIG. 2 to FIG. 4, the cam 122 and the slot 10 can mate with each other, and when the cam 122 is rotated by 90 degrees, it can force the first sliding block 3 and the second sliding block 4 to move away from each other. The driving structure 123 is used for connecting a driving device (not shown in the figures), which drives the bolt 12 to rotate. As can be understood by those skilled in the art that the driving structure 123 may be in the shape of hexagonal cylinder, square cylinder, ellipse cylinder or hex socket, etc., to match the driving device. In an optimized embodiment of the present application, the screw cap 121, the cam 122 and the driving structure 123 can be integrated on the bolt 12, or they can be separately provided by those skilled in the art as desired and then connected together by threads.

With continued reference to FIG. 2 and FIG. 3, the quick locking-unlocking assembly of the application also includes a stopper in the outer shell 11 of the power battery, which includes a sleeve 13 in threading connection with the bolt 12, a retaining sheath 14, a third spring 15 (the second restoration spring described in the claims), a locking cap 16, a fastening nut 17 and a sealing cover 18. The retaining sheath 14 is fixedly connected (for example, by welding or interference fit, etc.) to the outer shell 11 and at its top provided with a retaining slot 141, the shape of which mates with the cam 122. When the cam 122 is inserted into the retaining slot 141, the slot 141 can limit rotation of the bolt 12. The locking cap 16 is in fixed connection with the outer shell 11 (by means of welding, bolting and threading, and so forth). The sleeve 13 is inserted within the third spring 15, the lower end of which biases against the flange of the sleeve 13 (as shown in the figures) and the upper end of which biases against the lower end of the retaining sheath 14. The fastening nut 17 is in threading connection with the bolt 12. Further, in the locking state shown in FIG. 2, the upper surface of the fastening nut 17 abuts the locking cap 16, preferably the contact surfaces of them can be respectively provided with anti-slip textures, in order to avoid loosening of the connection of the bolt 12 and the fastening nut 17 caused by vibration of the power battery.

Figure 5:
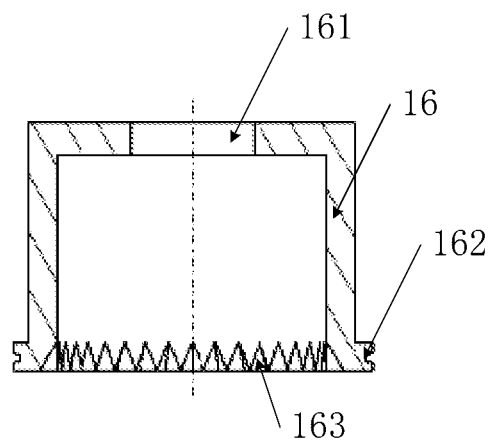
FIG. 5 is a cross sectional view of the locking cap of the quick locking-unlocking assembly of the present application.

As shown in FIG. 5, the locking cap 16 is provided with a through hole 161, a lip structure 162 and a tooth-shaped groove 163. Wherein the through hole 161 allows the bolt 12 to insert through, and the lip structure 162 and the tooth-shaped groove 163 enable the locking cap 16 and the sealing cover 18 to mate and connect with each other.

Figure 6:
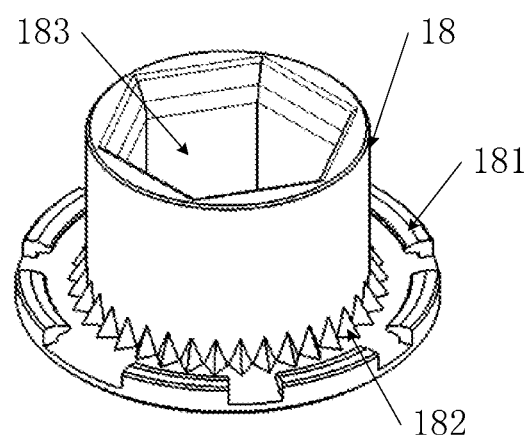
FIG. 6 is a schematic illustration of the sealing cover of the quick locking-unlocking assembly of the present application.

As shown in FIG. 2, 3 and 6, the sealing cover 18 is provided with a set of clips 181, teeth structure 182 and hex socket 183. In the assembled state of the sealing cover 18 and the locking cap 16, the set of clips 181 can mate with the lip structure 162 to prevent the sealing cover 18 from falling off, the teeth structure 182 and the tooth-shaped groove 163 mate with one another to mainly prevent the sealing cover 18 from rotating relative to the locking cap 16. The hex socket 183 mates with the fastening nut 17 to mainly avoid rotation of the sealing cover 18 relative to the fastening nut 17. In addition, the hex socket 183 is provided with a guide structure at its edge (not indicated in the figures) for conveniently leading the fastening nut 17 into the sealing cover 18. It should be understood by those skilled in the art that the mated sealing cover 18 and locking cap 16 form a sealing cavity (not indicated in the figures) for isolating the fastening nut 17 from the outside, which prevents contaminants (such as dust and slurry) from adhering to the bolt 12 and the fastening nut 17 and restricts rotation of the fastening nut 17 around its axis by mating the sealing cover 18 with the fastening 17 and the locking cap 16 such that loosening of the power battery from the body of the electric vehicle due to jerking ride of the electric vehicle and therefore poor contact of the electric circuit and damage to the power battery can be effectively avoided.

Further, as shown in FIG. 3, the lower end of the sealing cover 18 is provided with thread holes 184, and the sealing cover 18 is able to be connected with the driving device of the battery swapping station (a battery swapping tool, for example) through the thread holes 184 so that the driving device can pull the sealing cover 18 out of the locking cap 16.

The principle and working flow path of the quick locking-unlocking assembly of the present application will be detailed below in connection with the FIG. 7 to 13. Wherein the process of mounting the power battery onto the electric vehicle is shown in FIG. 7 to 9; and the process of detaching the power battery from the electric vehicle is shown in FIG. 10 to 13.

Figure 7:
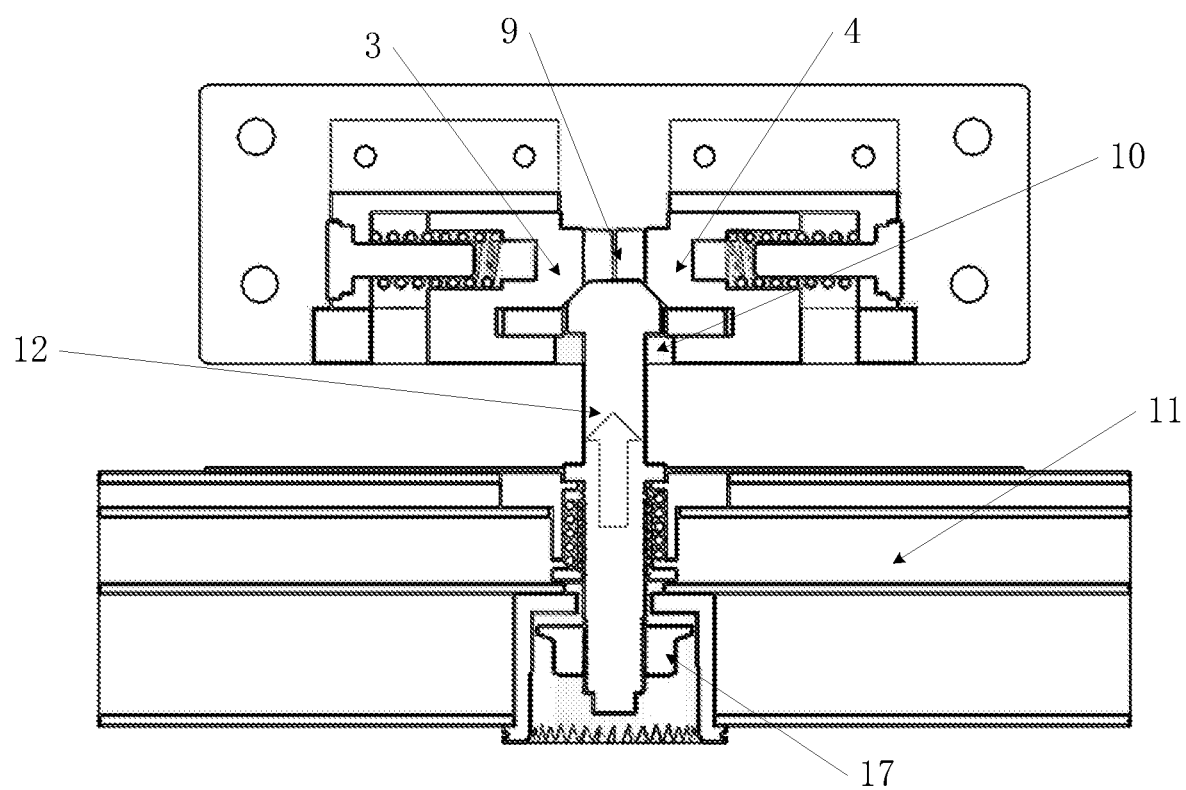
FIG. 7 is a schematic illustration of the bolt, the first sliding block and the second sliding block in their initial contact state, when the quick locking-unlocking assembly of the present application is being locked.

As shown in FIG. 7, when the power battery needs to be attached onto the electric vehicle, with aid of a battery swapping robot in the battery swapping station, the power battery is firstly aligned with its mounting place on the electric vehicle and then slowly lifted upwards until the screw cap 121 of the bolt 12 is in contact with the first and second sliding blocks 3 and 4 as shown in FIG. 7, that is to say, the screw cap 121 and the lower edge of the guide hole 9 are in contact with one another.

Figure 8:
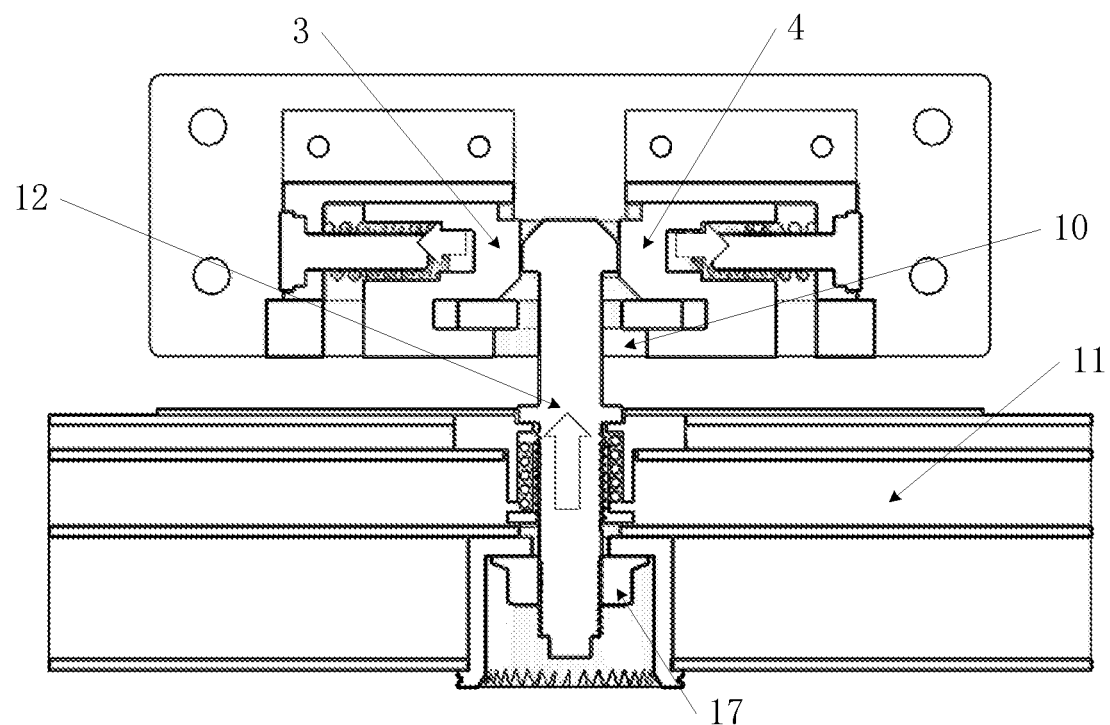
FIG. 8 is a schematic illustration of the first and second sliding blocks opened by the screw cap of the bolt, when the quick locking-unlocking assembly of the present application is being locked.

As shown in FIG. 8, as the power battery is further lifted upwards, the screw cap 121 enters the guide hole 9 and therefore forces the first sliding block 3 and the second sliding block 4 to move outwards in opposite directions.

Figure 9:
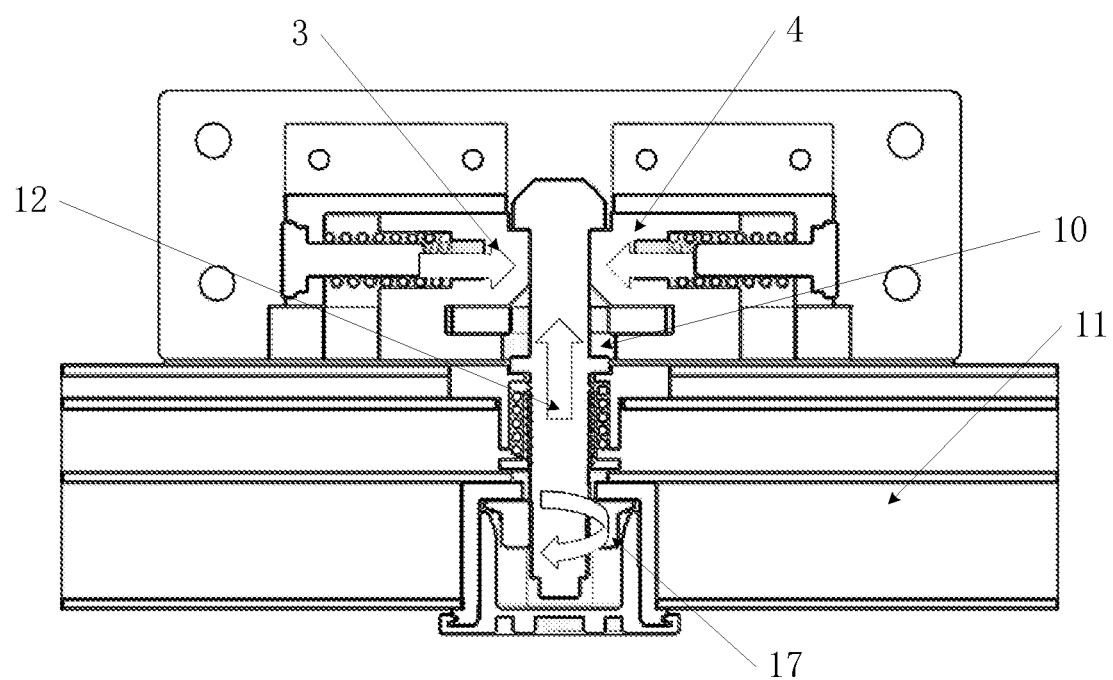
FIG. 9 is a state view of the bolt being locked by the first and second sliding blocks, when the quick locking-unlocking assembly of the present application is locked.

As shown in FIG. 9, as the power battery is further lifted upwards, the screw cap 121 passes through the guide hole 9, then the separated first and second sliding blocks 3 and 4 move closer to each other under the force of the first spring 5 and the second spring 6, until inner ends of the first and second sliding blocks 3 and 4 radially abut the bolt 12. Further, since the retaining sheath 14 is fastened to the outer shell 11 of the battery, under the force of the third spring 15, the sleeve 13 and the bolt 12 move together downwards until the lower surface of the screw cap 121 abuts the upper surfaces of the first and second sliding blocks 3 and 4, then the fastening nut 17 is screwed by the driving device (a battery swapping tool or a torque spanner driven by a servo motor, for example), and the sealing cover 18 is mounted onto the locking cap 16. So far the power battery is locked onto the electric vehicle by the quick locking-unlocking assembly of the present application.

Figure 10:
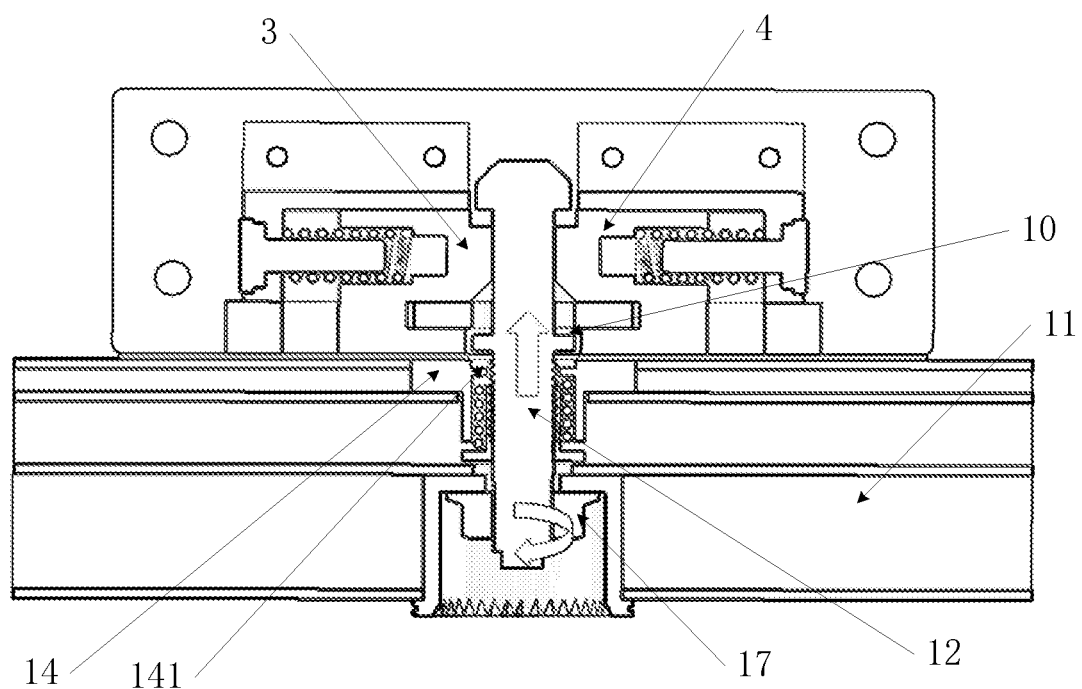
FIG. 10 is a schematic illustration of the movement of the bolt cam rotating by 90 degrees, when the quick locking-unlocking assembly of the present application is being unlocked.

As shown in FIG. 10, when the power battery needs to be detached from the electric vehicle, the sealing cover 18 is taken off and the fastening screw 17 is screwed downwards by a distance (for example, 5 mm) at first, and then the driving device overcomes the spring force of the third spring 15 to lift the bolt 12 upwards by a distance (for example, 3 mm) such that the screw cap 121 is brought out of contact with the first and second sliding blocks 3 and 4, and the cam 122 is introduced into the slot 10 in the meantime.

Figure 11:
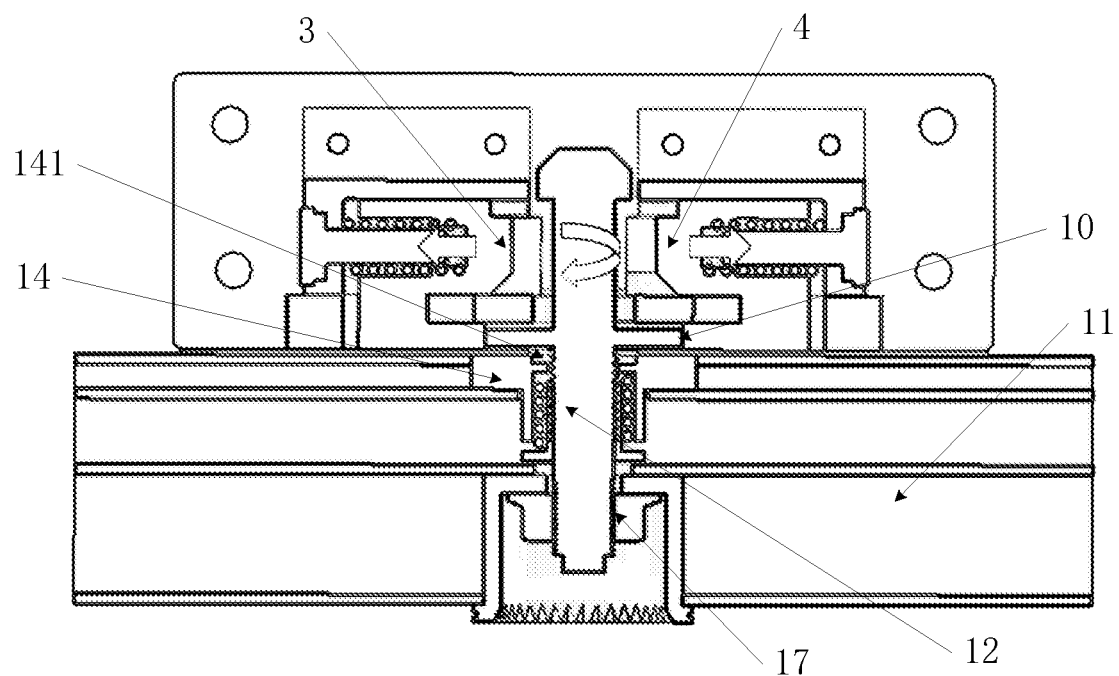
FIG. 11 is a schematic illustration of the first and second sliding blocks opened by the cam of the bolt, when the quick locking-unlocking assembly of the present application is being unlocked.

As shown in FIG. 11, the bolt 12 is driven by the driving device to rotate by 90 degrees, now the diameter of the cam 122 in the sliding direction of the first sliding block 3 and the second sliding block 4 becomes larger to force the first and second sliding blocks 3 and 4 to move away from one another, accordingly, the opening of the guide hole 9 is getting wider for the screw cap 121 to successfully pass through.

Figure 12:
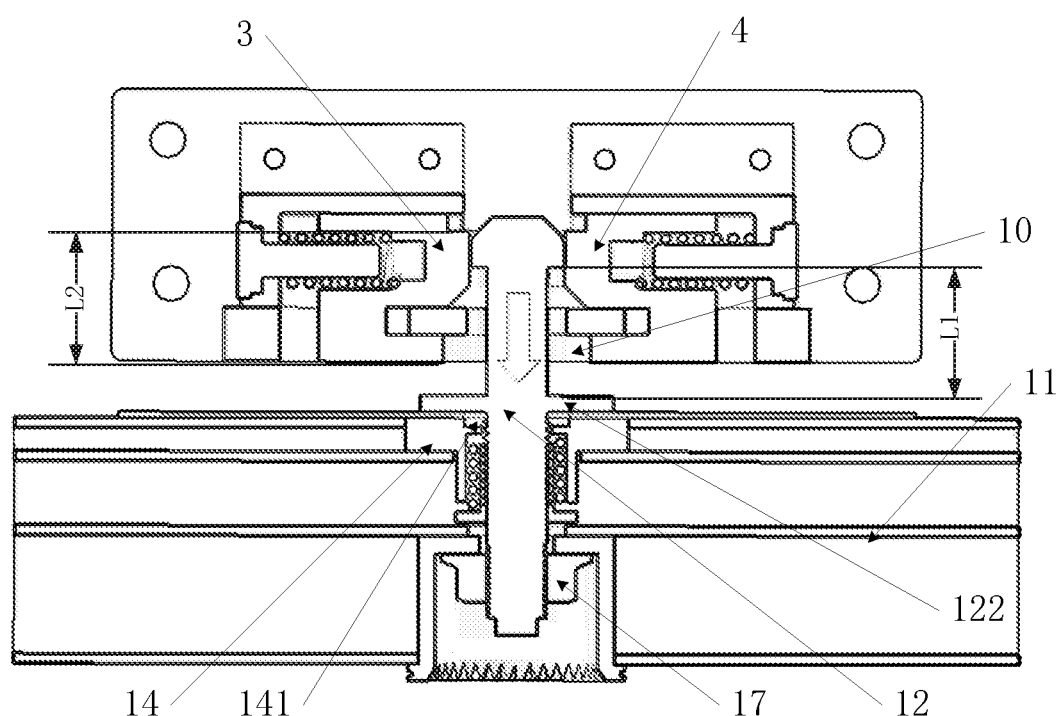
FIG. 12 is a schematic illustration of the first and second sliding blocks opened by the screw cap of the bolt, when the quick locking-unlocking assembly of the present application is being unlocked.

As shown in FIG. 12, as the power battery moves downwards, the bolt 12 moves downwards under the force of the third spring 15. It should be pointed out that the requirement of $L1 \leq L2$ (preferably, $L1<L2$) should be met, in order that the screw cap 121 is introduced into the guide hole 9 before the cam 122 leaves the slot 10, wherein L1 is the distance between the lower surface of the screw cap 121 and the upper surface of the cam 122 and L2 is the distance between the upper and lower surfaces of the sliding block 3 or the sliding block 4. Additionally, a damping mechanism can be provided between the sliding blocks 3 and 4 and the battery bracket portion 202 as desired by those skilled in the art, in order that moving speed of the first and second sliding blocks 3 and 4 driven by the first and second springs 5 and 6 can be lowered and thus the screw cap 121 is already introduced into the guide hole 9 before the cam 122 leaves the slot 10.

Figure 13:
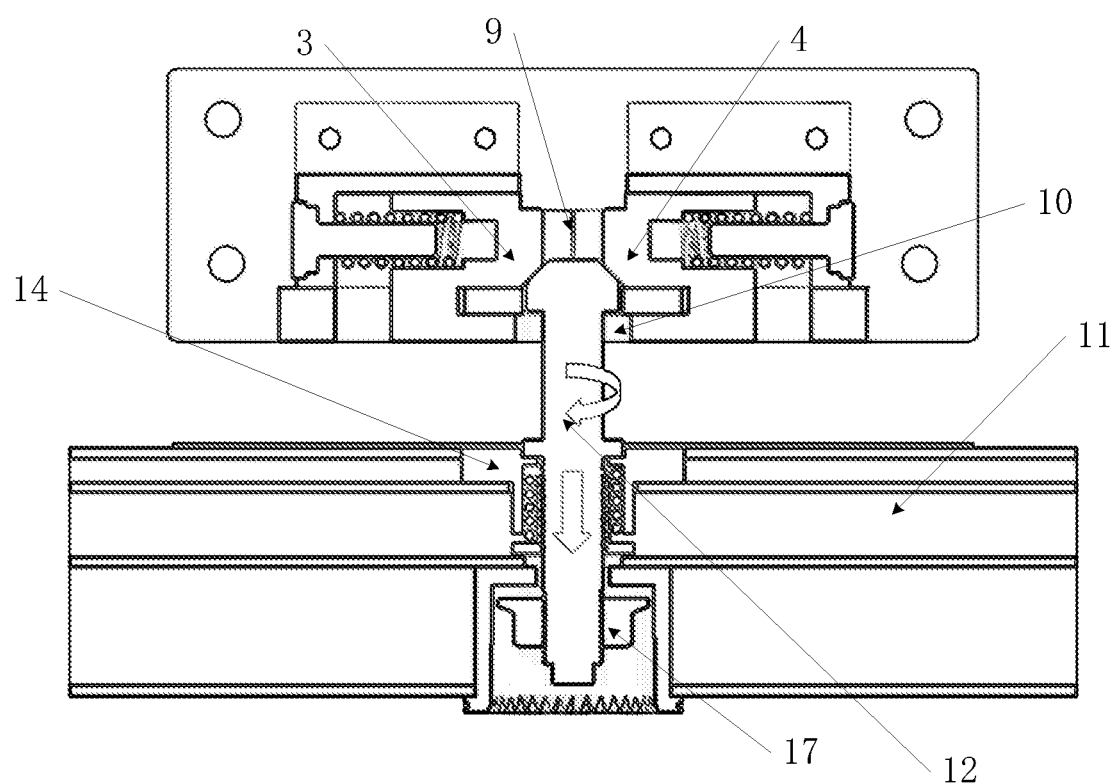
FIG. 13 is a schematic illustration of the movement of the bolt cam rotating backwards by 90 degrees, when the quick locking-unlocking assembly of the present application is completely unlocked.

As shown in FIG. 13, when the screw cap 121 leaves the guide hole 9, the bolt 12 is driven by the driving device to rotate by 90 degrees again, such that the cam 122 is clamped into the retaining slot 141 under the force of the third spring 15 to prevent the bolt 12 from rotating and facilitate the next mounting of the power battery onto the electric vehicle. Up to now, the process of dismounting the power battery from the electric vehicle is completed by means of the quick locking-unlocking assembly of the present application, that is to say, the power battery is separated from the electric vehicle completely.

As can be understood by those skilled in the art that in the optimized embodiments of the application, the screw cap 121 of the bolt 12 is locked by means of the first sliding block 3 pretensioned by the first spring 5 and the second sliding block 4 pretensioned by the second spring 6. The cam 122 of the bolt 12 is rotated by 90 degrees to force the first sliding block 3 and the second sliding block 4 to depart from each other such that the present quick locking-unlocking assembly is unlocked. By means of mating the bolt 12 with the fastening nut 17, mating the fastening nut 17 with the sealing cover 18, mating the sealing cover 18 with the locking cap 16 and mating the cam 122 with the retaining slot 141, the bolt 12 will not rotate relative to the fastening nut 17 when locking the power battery onto the electric vehicle, accordingly stable locking of the power battery onto the electric vehicle is ensured by the quick locking-unlocking assembly of the present application.

Consequently, the quick locking-unlocking assembly of the present application can not only reliably lock and unlock a power battery but also have the advantages of simple structure, convenient operation and lower manufacturing cost.

So far the technical solutions of the present application have been described with reference to the preferred embodiments shown in the accompanying figures. However, as will be understood by those skilled in the art, these specific embodiments are not intended to limit protection scope of the application. Without departing from the principle of the application, various changes may be made and equivalents may be substituted for related technical features, the varied or substituted technical solutions will fall within the protection scope of the application.

What is claimed is:

1. A quick locking-unlocking assembly for attaching a power battery to and detaching it from an object device, comprising:
   a bolt which is provided in the power battery and able to move relative to the battery in an axis direction; and
   a set of sliding blocks including more than one sliding blocks, wherein the more than one sliding blocks are slidably connected to the object device respectively and by means of sliding, form a guide hole allowing the bolt to move;
   wherein the bolt has a flange-shaped structure radially extending outwards, the flange-shaped structure can synchronously rotate along with the bolt, thereby forcing the more than one sliding blocks to slide in a way that enlarges diameter of the guide hole.

2. The quick locking-unlocking assembly as set forth in claim 1, wherein the flange-shaped structure is a cam.

3. The quick locking-unlocking assembly as set forth in claim 2, wherein the set of sliding blocks includes a first sliding block and a second sliding block opposed to each other,
   in assembled state, the bolt is radially housed within the guide hole formed by the first and second sliding blocks, and the screw cap of the bolt axially abuts the first and second sliding blocks;
   then by rotating the bolt, the first sliding block and the second sliding block slide to move away from each other, enabling the screw cap to move within the guide hole.

4. The quick locking-unlocking assembly as set forth in claim 3, wherein each of the sliding blocks is provided with a cavity and a restoration assembly in its sliding direction, each restoration assembly includes:
   a guide post which is secured to the object device and able to enter/exit its respective cavity; and
   a first restoration spring provided between its respective guide post and its respective cavity.

5. The quick locking-unlocking assembly as set forth in claim 2, wherein each of the sliding blocks is provided with a cavity and a restoration assembly in its sliding direction, each restoration assembly includes:
   a guide post which is secured to the object device and able to enter/exit its respective cavity; and
   a first restoration spring provided between its respective guide post and its respective cavity.

6. The quick locking-unlocking assembly as set forth in claim 5, wherein the quick locking-unlocking assembly also comprises a stopper which includes:
   a sleeve surrounding the outside of the bolt;
   a retaining sheath provided in outer shell of the power battery; and
   a second restoration spring provided between the sleeve and the retaining sheath.

7. The quick locking-unlocking assembly as set forth in claim 6, wherein one end of the retaining sheath is provided with a retaining slot,
   in assembled state, the flange-shaped structure of the bolt rests in the retaining slot to prevent the bolt from rotating.

8. The quick locking-unlocking assembly as set forth in claim 1, wherein each of the sliding blocks is provided with a cavity and a restoration assembly in its sliding direction, each restoration assembly includes:
   a guide post which is secured to the object device and able to enter/exit its respective cavity; and
   a first restoration spring provided between its respective guide post and its respective cavity.

9. The quick locking-unlocking assembly as set forth in claim 8, wherein the quick locking-unlocking assembly also comprises a stopper which includes:
   a sleeve surrounding the outside of the bolt;
   a retaining sheath provided in outer shell of the power battery; and
   a second restoration spring provided between the sleeve and the retaining sheath.

10. The quick locking-unlocking assembly as set forth in claim 9, wherein one end of the retaining sheath is provided with a retaining slot,
   in assembled state, the flange-shaped structure of the bolt rests in the retaining slot to prevent the bolt from rotating.

11. The quick locking-unlocking assembly as set forth in claim 10, wherein the bolt is connected with a fastening nut, through which the bolt is connected with the outer shell of the power battery.

12. The quick locking-unlocking assembly as set forth in claim 11, wherein the outer shell of the power battery is provided with a locking cap,
   in assembled state, the fastening nut abuts the locking cap in an axial direction.

13. The quick locking-unlocking assembly as set forth in claim 12, wherein the locking cap is connected with a sealing cover,
   in assembled state, the fastening nut is disposed within a sealing cavity formed by the locking cap and the sealing cover.

* * * * *